United States Patent
Vashist et al.

(10) Patent No.: US 8,315,956 B2
(45) Date of Patent: Nov. 20, 2012

(54) SYSTEM AND METHOD USING HIDDEN INFORMATION

(75) Inventors: Akshay Vashist, Plainsboro, NJ (US); Vladimir Vapnik, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 957 days.

(21) Appl. No.: 12/276,674

(22) Filed: Nov. 24, 2008

(65) Prior Publication Data

US 2009/0204555 A1  Aug. 13, 2009

Related U.S. Application Data

(60) Provisional application No. 61/026,868, filed on Feb. 7, 2008.

(51) Int. Cl.
*G06F 15/18* (2006.01)
*G06E 1/00* (2006.01)

(52) U.S. Cl. .................. 706/12; 706/15; 706/25

(58) Field of Classification Search .......... None
See application file for complete search history.

(56) References Cited

U.S. PATENT DOCUMENTS

| | | | | |
|---|---|---|---|---|
| 5,794,190 A | * | 8/1998 | Linggard et al. | 704/232 |
| 6,134,344 A | * | 10/2000 | Burges | 382/155 |
| 2002/0016798 A1 | * | 2/2002 | Sakai et al. | 707/517 |
| 2002/0090631 A1 | * | 7/2002 | Gough et al. | 435/6 |
| 2004/0034612 A1 | * | 2/2004 | Mathewson et al. | 706/46 |
| 2004/0068199 A1 | * | 4/2004 | Echauz et al. | 600/544 |
| 2005/0197980 A1 | * | 9/2005 | Dundar et al. | 706/16 |

OTHER PUBLICATIONS

Vapnik, V. "Estimation of Dependences Based on Empirical Data: Empirical Inference Science", Springer, 2006 pp. 438-443.
Cortes, C. et al., "Support Vector Networks", Machine Learning, vol. 20, pp. 273-297, 1995.
Boser, B. et al., "A Training Algorithm for Optimal Margin Classifiers", Proceedings of the Fifth Annual Workshop on Computation Learning Theory, vol. 5, pp. 144-152, 1992.

* cited by examiner

*Primary Examiner* — Jeffrey A Gaffin
*Assistant Examiner* — Adrian Kennedy
(74) *Attorney, Agent, or Firm* — Joseph Kolodka

(57) ABSTRACT

A method and system for use in describing a phenomenon of interest. The method and system computes a decision rule for use in describing the phenomenon of interest using training data relating to the phenomenon of interest, labels for labeling the training data, and hidden information about the training data or directed distances obtained from the hidden information, as inputs.

15 Claims, 3 Drawing Sheets

SYSTEM AND METHOD USING HIDDEN INFORMATION

RELATED APPLICATIONS

This application claims the benefit of U.S. Provisional Application No. 61/026,868, filed Feb. 7, 2008. The disclosure of U.S. Provisional Application No. 61/026,868 is incorporated herein by reference.

FIELD OF THE INVENTION

This invention relates to learning machines and, more particularly, to supervised learning systems and methods using hidden information.

BACKGROUND

In the classical supervised machine learning paradigm, training examples are represented by vectors of attributes, a teacher supplies labels for each training example, and a learning machine learns a decision rule using this data.

In actuality, however, the teacher can supply training data with some additional information which will not be available at the test stage. Consider, for example, an algorithm that learns a decision rule for prognosis of a disease in a year, given the current symptoms of a patient. In this example, additional information about symptoms in six months can be provided along with the training data that contains current symptoms and outcome in a year. This additional information about symptoms in six months may be helpful for predicting the outcome of the disease in a year.

Accordingly, a machine learning method that uses hidden information is needed.

SUMMARY

A method is disclosed herein for use in describing a phenomenon of interest. The method comprises the steps of: providing training data relating to the phenomenon of interest and labels for labeling the training data; providing hidden information about the training data or directed distances obtained from the hidden information; and computing a decision rule for use in describing the phenomenon of interest using the training data, the labels, and the hidden information or directed distances.

A machine learning system is further disclosed herein for use in describing a phenomenon of interest. The machine learning system comprises: a first input module for providing training data relating to the phenomenon of interest and labels for labeling the training data; a second input module for providing hidden information about the training data or directed distances obtained from the hidden information; and a processor executing a first set of instructions for computing a decision rule for use in describing the phenomenon of interest using the training data, the labels for labeling the training data, and the hidden information about the training data or the directed distances.

Also disclosed herein is a method for training a learning machine. The method comprises the steps of: providing training data relating to the phenomenon of interest and labels for labeling the training data; providing hidden information about the training data or directed distances obtained from the hidden information; and computing a decision rule for use in describing a phenomenon of interest using the training data, the labels, and the hidden information or directed distances.

DETAILED DESCRIPTION OF THE INVENTION

Figure 1:
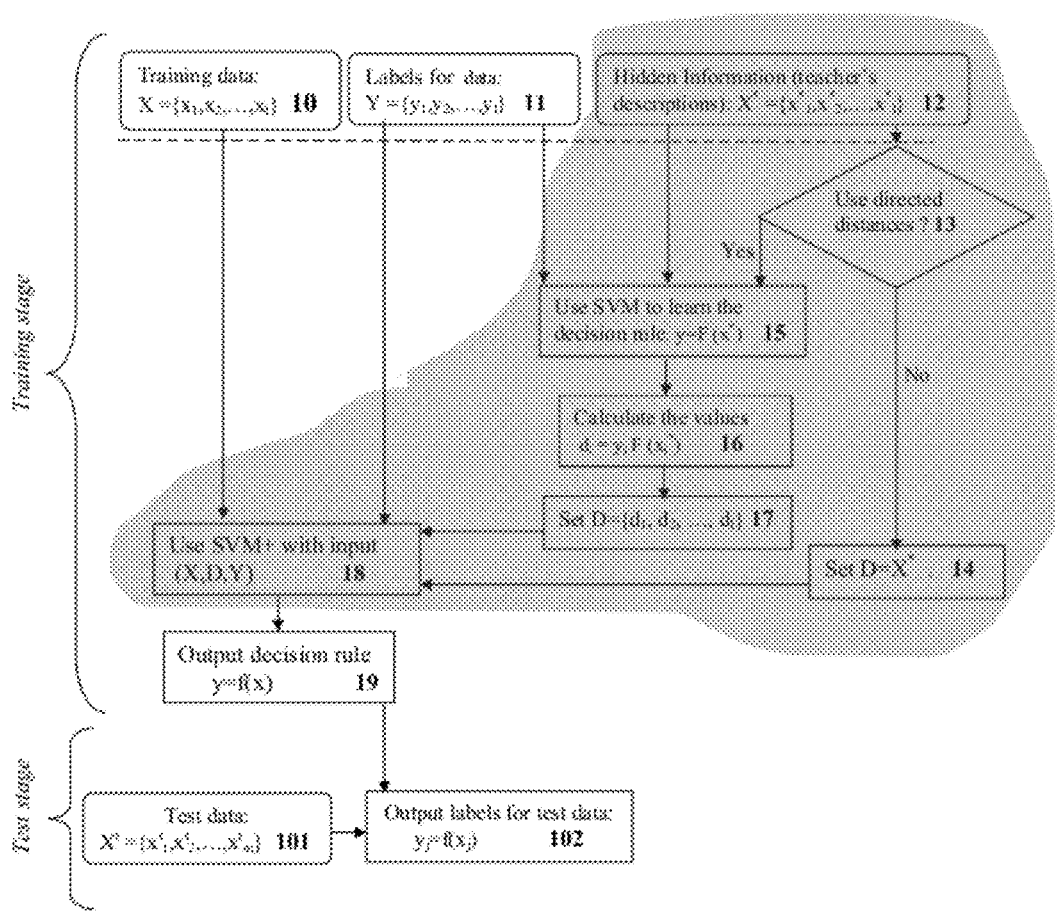
FIG. 1 is a block diagram of an embodiment of a computer system for machine learning using hidden information according to the present disclosure.

A supervised machine learning method and system is disclosed herein that uses training data, labels for the training data, and hidden information about the training data, to generate an improved decision rule. The hidden information about the training data may belong to a space which is different from the training data space. In addition, the hidden information does not lead to additional training data, but instead, contains additional description about the training data.

The machine learning method and system of the present disclosure, according to one embodiment, uses a support vector machine (SVM) type of algorithm. Other embodiments of the method and system may use other types of supervised learning algorithms. As is well known in the art, the SVM algorithm is a supervised learning algorithm which learns a decision rule, $y=f(x)$, from a set of functions given training data.

$$(X,Y)=\{(x_i,y_i)\}_{i=1}^l, y_i \in \{-1,1\}.$$

To construct a decision rule $y=f(x)$, the SVM algorithm maps vectors $x \in X$ to $z \in Z$ and finds a hyperplane that separates the images $z_i$'s of training vectors $x_i$'s in two classes with a minimal number of errors. Among the many possible hyperplanes, the SVM algorithm selects the optimal one that does this separation with maximum margin. The hyperplane is specified by a weight vector w and a threshold b which are found by solving the quadratic optimization problem (1):

$$\underset{w,b,\xi}{\text{minimize}} \quad \frac{1}{2}w^2 + C\sum_{i=1}^l \xi_i \qquad (1)$$

$$\text{subject to } y_i(wz_i+b) \geq 1-\xi_i, \quad i=1,\ldots,l$$

$$\xi_i \geq 0, \qquad i=1,\ldots,l$$

where C is fixed and $\xi_i$'s are the slack variables. The SVM algorithm finds the optimal hyperplane by solving the optimization problem (1) in the dual space. The SVM algorithm does not calculate the inner product in Z space. Instead, it uses the "kernel trick." According to Mercer's theorem, for every inner product in Z space, there exists a positive definite function $K(x_i,x_j)$, (kernel function) such that $z_i \cdot z_j = K(x_i,x_j)$, for all $i,j=1,\ldots,l$. So, only the kernel function needs to be specified for learning a nonlinear decision rule. The decision rule for the SVM algorithm has a form:

$$y = f(x) = \text{sgn}\left(\sum_{i=1}^l \alpha_i y_i K(x_i, x) + b\right) \qquad (2)$$

where the coefficients $\alpha_i$ are obtained by maximizing the functional $$\underset{\alpha}{\text{maximize}} \quad \sum_{i=1}^{l} \alpha_i - \frac{1}{2}\sum_{i=1}^{l}\sum_{j=1}^{l} \alpha_i y_i \alpha_j y_j K(x_i, x_j) \quad (3)$$

$$\text{subject to} \quad \sum_{i=1}^{l} \alpha_i y_i = 0,$$

$$0 \le \alpha_i \le C, \quad i = 1, \ldots, l.$$

With increasing training data, the SVM solution converges to the Bayesian solution.

The machine learning method of the present disclosure also uses a support vector machine plus (SVM+) algorithm for learning hidden information by modeling slacks using hidden information. At the training stage using the SVM+ algorithm, the following triplets are provided:

$$(X, X^*, Y) = \{(x_i, x_i^*, y_i)\}_{i=1}^{l}, \; y_i \in \{-1, 1\}.$$

where $X^*$ is additional information from the data space $X^*$, which is generally different from space X. The goal is to use the additional information $X^*$ to find a decision rule $y=f(x)$ (in the space X), which is better than the decision rule obtained without using the additional information. The space X in which the decision rule is constructed may be called the decision space, and the space $X^*$ may be called the correction space. Compared to conventional supervised learning methods where the teacher only provides labels for training vectors, the teacher in the SVM+ based learning method also supplies additional descriptions as hidden information for the training data e.g., vectors.

The SVM+ algorithm is a generalization of the SVM algorithm. It allows model relationships between the slack variables, $\xi_i$ in problem (1) above, in the SVM algorithm, i.e., $$\xi_i = \psi(x_i^*, \delta), \; \delta \in D$$

where $\psi = (x_i^*, \delta)$ belongs to some set of admissible functions in $X^*$, called the correcting functions. This is a generalization of the SVM algorithm because $X^*=X$ and $\psi(x_i, \delta)$ is the set of all possible functions in the SVM algorithm. Because slacks are no longer variables in the optimization problem in the SVM+ algorithm, the SVM+ algorithm can depend on less parameters than the SVM algorithm, consequently, the decision rule found by the SVM+ algorithm is selected from a set with a smaller capacity than the SVM algorithm, which can lead to a better generalization. Similar to the mapping of vectors $x_i \in X$ to the space $z_i \in Z$ in the decision space, the vectors $x_i^* \in X^*$ in correction space are mapped to $z_i^* \in Z^*$. To accomplish this, two different kernels, the decision kernel (represented by $K(,)$) and the correction kernel (represented by $K^*(,)$) are used. The correcting function has the form $$\psi(x_i^*, \delta) = w^* z_i^* + d; \; w^* \in Z^*, \; d \in R \quad (4)$$

Using this mapping, the slacks can be written as $\xi_i = w^* z_i^* + d$. This leads to the following SVM+ problem formulation:

$$\underset{w,b,w^*,d}{\text{minimize}} \quad \frac{1}{2}w^2 + \frac{\gamma}{2}w^{*2} + C\sum_{i=1}^{l}(w^* z_i^* + d) \quad (5)$$

$$\text{subject to} \quad y_i(w z_i + b) \ge 1 - (w^* z_i^* + d), \; \forall i$$

$$(w^* z_i^* + d) \ge 0, \; \forall i$$

where $\gamma$ and C are parameters. The dual optimization problem corresponding to equation (5) using the kernel trick is:

$$\underset{\alpha,\beta}{\text{maximize}} \quad \sum_{i=1}^{l} \alpha_i - \frac{1}{2}\sum_{i=1}^{l}\sum_{j=1}^{l} \alpha_i y_i \alpha_j y_j K(x_i, x_j) \quad (6)$$

$$- \frac{1}{2\gamma}\sum_{i=1}^{l}\sum_{j=1}^{l}(\alpha_i + \beta_i - C)(\alpha_j + \beta_j - C)K^*(x_i^*, x_j^*)$$

$$\text{subject to} \quad \sum_{i=1}^{l} \alpha_i y_i = 0,$$

$$\sum_{i=1}^{l}(\alpha_i + \beta_i) = lC,$$

$$\alpha_i \ge 0, \; \beta_i \ge 0, \; \forall i.$$

The SVM+ decision rule has the same form as the SVM decision rule (2). It differs in the way it determines the coefficients $\alpha_i$s. The coefficients $\beta_i$'s appear only in the correcting function which is given by $$w^* z_i^* + d = \frac{1}{\gamma}\sum_{j=1}^{l}(\alpha_j + \beta_j - C)K^*(x_i^*, x_j^*) + d \quad (7)$$

The quadratic program (6) related to the SVM+ algorithm is different from the conventional SVM algorithm but can be solved using a known generalized sequential minimal optimization procedure for the SVM+ algorithm.

FIG. 1 shows an embodiment of a computer system for machine learning using hidden information according to the present disclosure. The system generally includes a training stage and a test stage. The training stage of the system includes a training data input module 10, a data labeling input module 11, and a hidden information input module 12. The training data input module 10 allows training data X to be inputted into the system and the data labeling input module 11 allows labeling data Y to be inputted into the system for labeling the training data X.

The hidden information input module 12 is used at the training stage for allowing hidden information $X^*$ to be inputted into the system by a teacher. The hidden information input module 12 is not used at the test stage because the decision rule used at the test stage depends only on the information in training data X. The information in hidden information $X^*$ is used only to estimate the coefficients $\alpha_i$'s in the decision rule. The hidden information $X^*$ may be some specific and/or additional information or description about or derived from the training data. Alternatively, the hidden information $X^*$ may be the same data as the training data X. The hidden information produces a better decision rule in the space X of conventional training data.

The hidden information may used in two different modes in the training stage of the system of FIG. 1, as determined using decision module 13, upon input from the hidden information input module 12. More specifically, the decision module 13 enables a user to select whether to use the hidden information directly in correction space to estimate a correcting function without any processing, or to process the hidden information to obtain directed distances $d_i$, i.e., the value of a decision function for the vector $x_i^*$, where the directed distances operate as correction space to estimate a correcting function. In the case of where the hidden information is processed, the decision function may be computed using a SVM or other suitable classifier on the data $(X^*, Y)$ where $x_i^*$ is provided as an input for the SVM. Alternatively, if the user selects to use the hidden information directly and not to use directed distances $d_i$ via the decision module 13, then a first set module 14 copies the hidden information X* directly from the hidden information input module 12 as set D. If, however, the user selects to use directed distances $d_i$ via the decision module 13, the above-mentioned decision function may be computed by using SVM module 15 on the data (X*, Y) where $x_i^*$ is provided as an input for the SVM. In other words, the SVM module 15 learns a decision rule y=F(X*) using labeling data Y inputted by the data labeling input module 11 and descriptions from the hidden information input module 12. A directed distances module 16 calculates directed distances $d_i$ from the decision rule y=F(x*) inputted by the SVM module 15, in the space of hidden information, and a second set module 17 sets the directed distances $d_i$ calculated by the directed distances module 16 to correcting information X*.

The training stage of the system further includes an SVM+ module 18 or other suitable classifier module, which receives inputs from the training data module 10, data labeling module 11, and the first or second set modules 14 and 17, to learn a decision rule y=f(x) for classifying the labeled training (X, Y) using SVM+ algorithm parameters and the inputted training data X, directed distances or hidden information D, and labeling data Y. A decision rule output module 19 outputs the decision rule y=f(X) computed by SVM+ module 18.

Referring still to FIG. 1, the test stage of the system includes a test data input module 101 and a test data labeling module 102. The test data input module 101 allows training data $X^t$ be inputted into the data labeling input module 102. The data labeling module 102 should use the same type of classifier as used for module 18, for example, a SVM+ classifier or other suitable module. The data labeling module 102 also receives as input the values generated by module 19 of the training stage.

Figure 2:
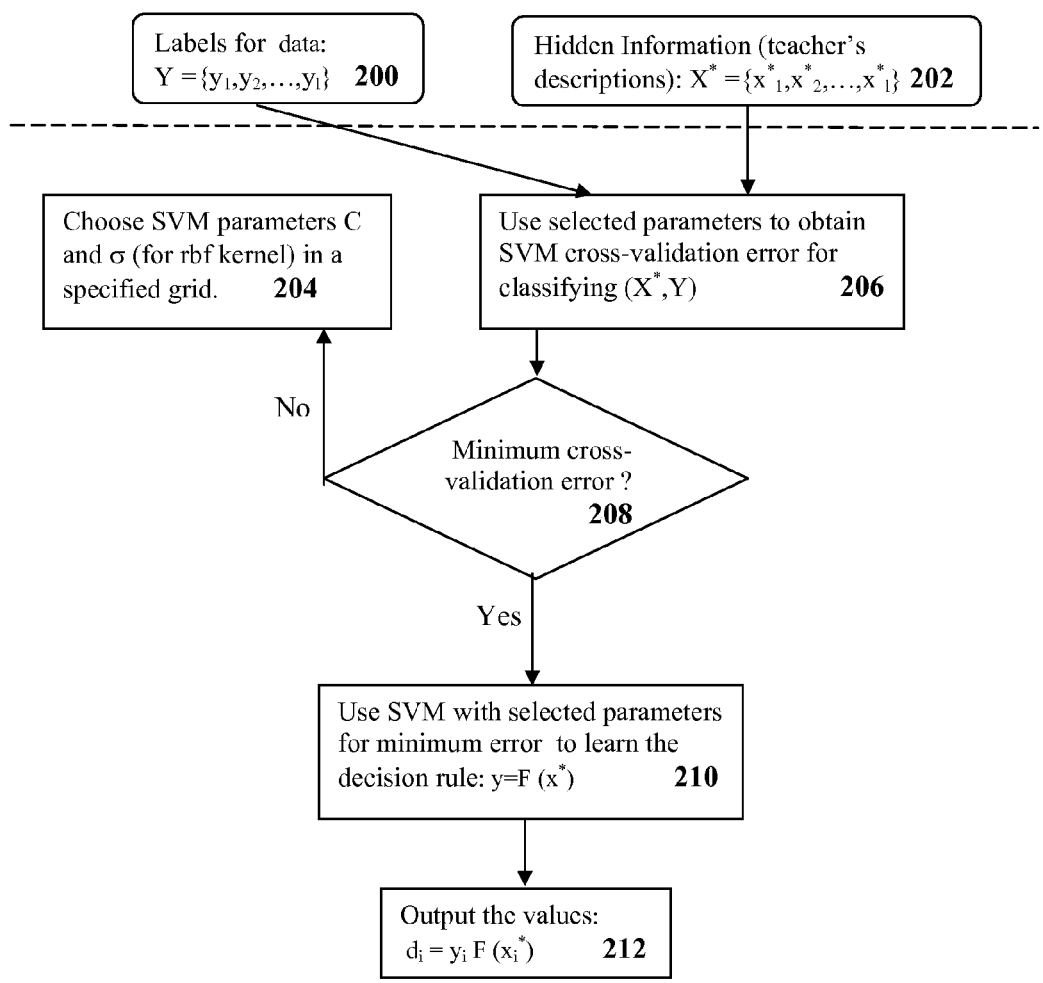
FIG. 2 is a flowchart depicting an embodiment of a method performed by the SVM and directed distances module of the computer system of FIG. 1.

FIG. 2 is a flowchart depicting a method performed by the SVM module 15 and the directed distances module 16 of FIG. 1, for determining the directed distances $d_i$ to the decision rule in the space of hidden information X*. In the method, labeling data Y 200, hidden information X* 202 and SVM parameters from a grid of SVM parameters 204, are inputs for determining a best set of SVM parameters for classifying (X*,Y) using cross-validation error 206. A selected pair of the SVM parameters in the grid will be used further on for training an SVM algorithm for classifying the labeling data Y and the hidden information X* in the space of hidden information. In one embodiment where the SVM algorithm uses an rbf kernel, the specified SVM parameters of the grid include C and σ. Other suitable kernels and range of parameters may be used in alternate embodiments.

From the grid of SVM parameters, pairs of the parameters are selected 204 and used along with labeling data Y 200 and the hidden information X* 202 to obtain an SVM cross-validation error 206 for initially classifying the labeling data Y and the hidden information X* in the space of hidden information. A determination 208 is made as to whether the selected pair of SVM parameters provide a minimum cross-validation error. If the selected pair of SVM parameters do not provide a minimum cross-validation error, another pair of SVM parameters are selected 204 and used along with labeling data Y 200 and the hidden information X* 202 to perform another SVM cross-validation error determination 208. If the selected pair of SVM parameters do provide a minimum cross-validation error, this pair of selected parameters are used to compute the SVM algorithm to learn the decision rule y=F(x*) 210 as described above in equation 3 to provide a final classification rule. Then, directed distances $d_i$ are calculated 212 from the decision rule y=F(x*) in the space of hidden information.

To illustrate the operation of the method of FIG. 2, consider an example where there exists a large number of triplets ($X_0$, $X_0^*$, $Y_0$), but are given a fixed set of training data ($X_1$, $X_1^*$, $X_1$) along with a large number of data ($X_2^*$, $Y_2$). Both of these sets are taken from ($X_0$, $X_0^*$, $Y_0$). In accordance with the method of FIG. 2, first, an is SVM algorithm is used for classifying ($X_2^*$, $Y_2$) to obtain the decision rule $$\hat{f}(x^*) = \text{sgn}\left(\sum_{j=1}^{|X_2^*|} \alpha_j y_j K(x_j^*, x^*) + b\right).$$

Second, for each training vector $x_i^*$, an estimate of directed distance is computed to the decision rule $\hat{f}(x^*)$ as $$d_j^a = y^i\left(\sum_{j=1}^{|x_2^*|} \alpha_j y_j K(x_j^*, x_i^*) + b\right), \text{ where } x_i^* \in X^*.$$

Finally, SVM+ algorithm is used with the input (X, $d^\alpha$, Y).

Also consider an example where we are given images of digits (X), their labels (Y) and poetic description about those digits (X*). In the proposed learning system, first poetic descriptions are used to estimate the directed distances, which are then used as correction space in an SVM+ algorithm. In accordance with the method of FIG. 2, an SVM algorithm is used with an rbf kernel to classify (X*, Y), to obtain the decision rule, $$f(x^*) = \text{sgn}\left(\sum_{j=1}^{|X^*|} \alpha_j y_j K(x_j^*, x_i^*) + b\right).$$

Next, the values directed distances are found, $$d_i^p = y_i\left(\sum_{j=1}^{|x^*|} \alpha_j y_j K(x_j^*, x_i^*) + b\right),$$

where $x_i^*$ is the poetic description for the training vector $x_i$.

Finally, a decision rule is obtained by using an SVM+ algorithm with input (X, $d^P$, Y)

Figure 3:
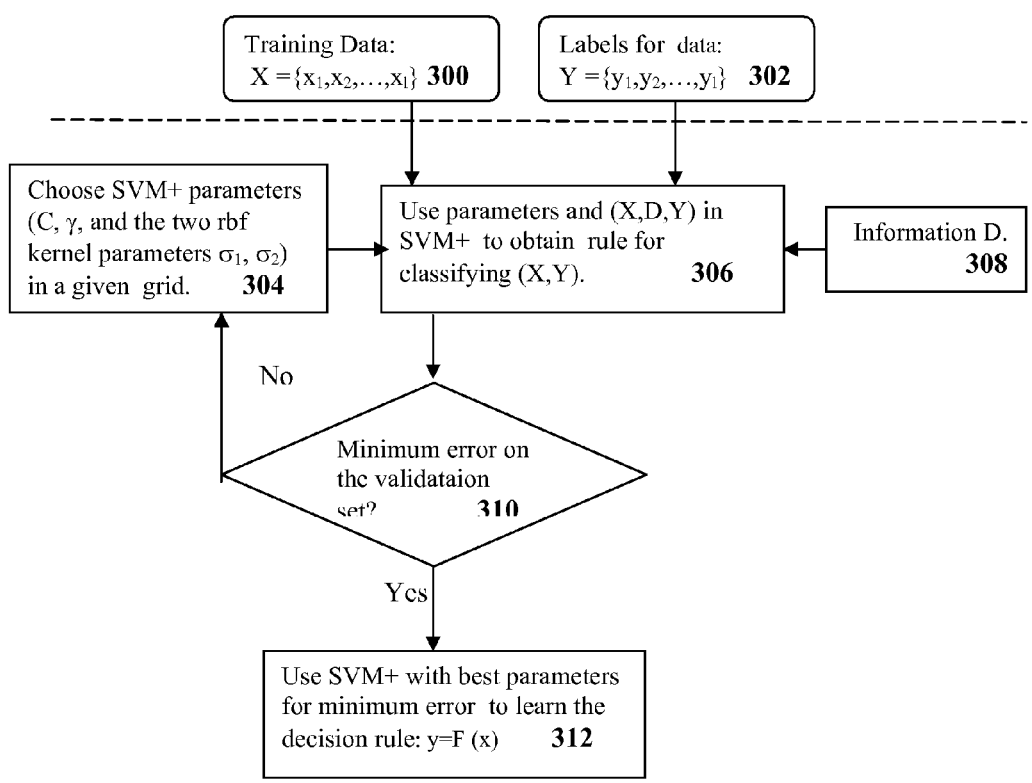
FIG. 3 is a flowchart depicting an embodiment of a method performed by the SVM+ module of the computer system of FIG. 1.

FIG. 3 is a flowchart depicting a method performed by the SVM+ module 18 of FIG. 1, for learning the decision rule y=f(x) from training data X and labeling data Y. The method commences with boxes 300 and 302, where training data X is provided (box 300) and labeling data Y is provided for labeling the training data X (box 302). In the method, training data X 300, labeling data Y 302, directed distances or hidden information D, and SVM+ parameters from a grid of SVM+ parameters 304, are inputs for training 306 an SVM+ algorithm 306 for classifying (X, Y). With respect to the SVM+ input parameters, a groups of these parameters will be selected from a pre-specified grid of parameter ranges, for training 306 the SVM+ algorithm. In one embodiment where the SVM+ algorithm uses an rbf kernel, the SVM+ parameters of the pre-specified grid include C and γ, and kernel parameters $\sigma_1$ and $\sigma_2$.

From the pre-specified grid of SVM+ parameters, groups of the parameters are selected 304 and used in the SVM+ algorithm along with training data X 300, labeling data Y 302 and directed distances or hidden information D 308 to obtain a decision rule that will be used further on for classifying X,Y. More specifically, for each selected group of parameters the SVM+ algorithm is solved as described above in equations 5 and 6, to obtain the decision rule. Equation 5 is the original formulation of SVM+ and uses hidden information to model slacks in the training data. To find the decision rule, however, it is easier to solve an equivalent optimization problem in equation 6, which is the dual of the problem in equation 5. The SVM+ optimization problem given by equations 5 and 6 is a simplified form of the conventional SVM+ algorithm. The simplified SVM+ optimization disclosed herein does not require grouping information for the input data, as all the input data is considered in one group. By considering one group for all the input data, the number of parameters in the optimization problem is reduced.

A determination 310 is made as to whether the selected group of SVM+ parameters provide a minimum error rate on a validation set. If the selected group of SVM+ parameters does not provide a minimum error rate, another group of SVM+ parameters are selected 304 and used along with training data X 300, labeling data Y 302 and directed distances or hidden information D 308, to perform another SVM+ minimum error rate determination 310. If the selected group of SVM+ parameters does provide a minimum error rate on the validation set, this group of selected parameters are used to compute the SVM+ algorithm to learn the decision rule y=f(X) 312.

The system and methods disclosed herein may be readily adapted and utilized in a wide array of applications to classify and/or predict data in multidimensional space, the data corresponding to a phenomenon of interest, e.g., images of objects and scenes obtained by cameras and other sensors, text, a voice, stock prices, etc. More specifically, the applications include, for example and without limitation, general pattern recognition (including image recognition, object detection, and speech and handwriting recognition), regression analysis and predictive modeling (including quality control systems and recommendation systems), data classification (including text and image classification and categorization), bioinformatics (including protein classification, automated diagnosis systems, biological modeling, and bio-imaging classification), data mining (including financial forecasting, database marketing), etc.

One skilled in the art will recognize that the computer system disclosed herein may comprise, without limitation, a mainframe computer system, a workstation, a personal computer system, a personal digital assistant (PDA), or other device, apparatus, and/or system having at least one processor that executes instructions which perform the methods disclosed herein. The instructions may be stored in a memory medium.

The computer system may further include a display device or monitor for displaying operations associated with the methods described herein and one or more memory mediums on which one or more computer programs or software components may be stored. For example, one or more software programs which are executable to perform the methods described herein may be stored in the memory medium. The one or more memory mediums may include, without limitation, CD-ROMs, floppy disks, tape devices, random access memories such as but not limited to DRAM, SRAM, EDO RAM, and Rambus RAM, non-volatile memories such as, but not limited hard drives and optical storage devices, and combinations thereof. In addition, the memory medium may be entirely or partially located in one or more associated computers or computer systems which connect to the computer system over a network, such as the Internet.

The methods described herein may also be executed in hardware, a combination of software and hardware, or in other suitable executable implementations. The methods implemented in software may be executed by the processor of the computer system or the processor or processors of the one or more associated computers or computer systems connected to the computer system.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

What is claimed is:

1. A method for use in describing a phenomenon of interest, the method comprising the steps of:
   providing training data relating to the phenomenon of interest and labels for labeling the training data;
   providing hidden information about the training data or directed distances obtained from the hidden information;
   computing a decision rule for use in describing the phenomenon of interest using the training data, the labels, and the hidden information or directed distances, said decision rule being performed by a classifier comprising a support vector machine plus (SVM+); and
   providing classifier parameters from a grid of classifier parameters as an input for the classifier, the training data, the labels, the hidden information or directed distances, and the parameters for determining a best set of parameters for computing the decision rule using a cross-validation error.

2. The method of claim 1, further comprising the step of computing the directed distances with a classifier.

3. The method of claim 2, wherein the classifier computes the directed distances using the labels and hidden information as inputs.

4. The method of claim 3, further comprising classifier parameters from a grid of classifier parameters as an input for the classifier, the labels, the hidden information and the parameters for determining a best set of parameters for computing the directed distances using a cross-validation error.

5. The method of claim 4, wherein the best set of parameters in the grid are used for training the classifier to classify the labels and the hidden information.

6. The method of claim 4, wherein the first classifier comprises a support vector machine (SVM) and the classifier parameters comprise SVM parameters.

7. The method of claim 1, wherein the best set of parameters in the grid are used for training the classifier to classify the labels and the training data.

8. A machine learning system for use in describing a phenomenon of interest, the machine learning system comprising:
   a first input module for providing training data relating to the phenomenon of interest and labels for labeling the training data;

a second input module for providing hidden information about the training data or directed distances obtained from the hidden information; and a processor executing a first set of instructions for computing a decision rule for use in describing the phenomenon of interest using the training data, the labels for labeling the training data, and the hidden information about the training data or the directed distances, the processor including a classifier comprising a support vector machine plus.

9. The system of claim 8, further comprising a second set of instructions executed by the processor for computing the directed distances using the labels and hidden information as inputs.

10. The system of claim 9, wherein the processor executing the second set of instructions comprises a classifier.

11. The system of claim 10, wherein the second set of instructions further uses classifier parameters from a grid of classifier parameters as an input for computing the directed distances, and wherein the labels, the hidden information and the parameters are for determining a best set of parameters for computing the directed distances using a cross validation error.

12. The system of claim 11, wherein the best set of parameters in the grid are used for training the classifier to classify the labels and the hidden information in a space of the hidden information.

13. The system of claim 10, wherein the classifier comprises a support vector machine.

14. The system of claim 8, wherein the first set of instructions further uses classifier parameters from a grid of classifier parameters as an input for computing the decision rule, and wherein the training data, the labels for labeling the training data, and the hidden information about the training data or the directed distances, and the parameters are for determining a best set of parameters for computing the decision rule using a cross-validation error.

15. The system of claim 14, wherein the best set of parameters in the grid are used for training the classifier to classify the labels and the training data.

* * * * *